April 19, 1966   E. F. MEKELBURG ET AL   3,247,345
CONTACTOR AND CONTACTOR AND ATTACHMENT COMBINATION
Filed March 8, 1963   6 Sheets-Sheet 1

INVENTORS
EARL F. MEKELBURG
DORN L. PETTIT
CARL B. SOHNS
JOSEF BIERENFELD
BY  *John H. Leonard*
their ATTORNEY.

April 19, 1966   E. F. MEKELBURG ET AL   3,247,345
CONTACTOR AND CONTACTOR AND ATTACHMENT COMBINATION
Filed March 8, 1963   6 Sheets-Sheet 2
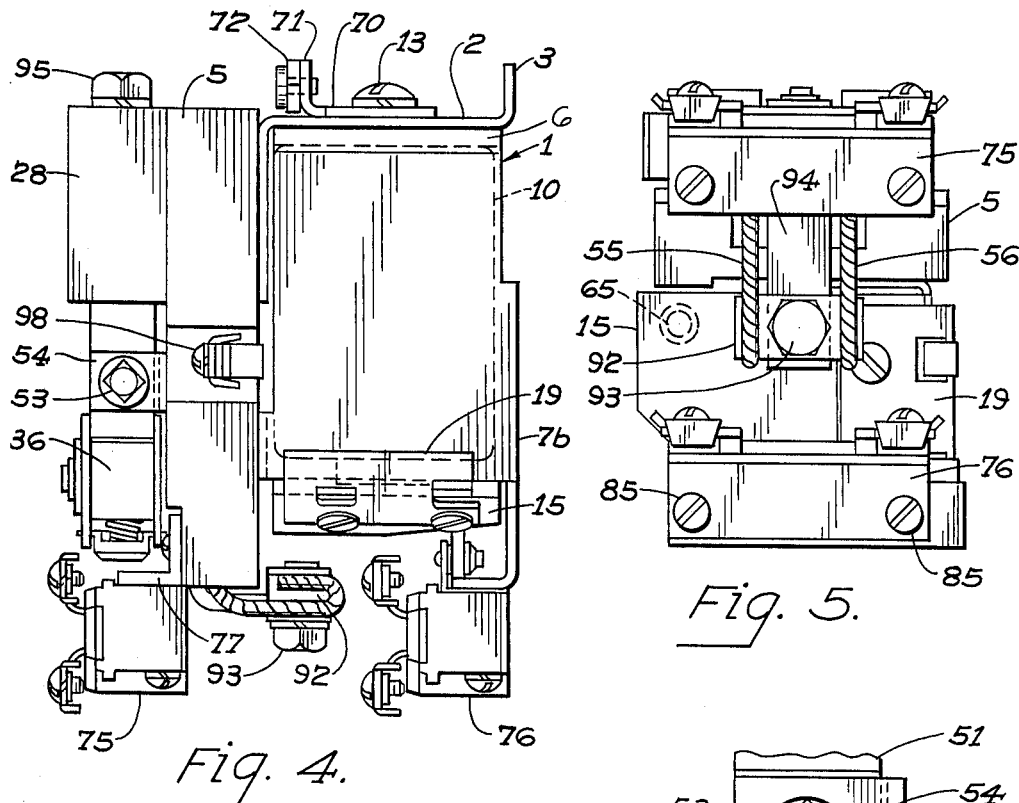
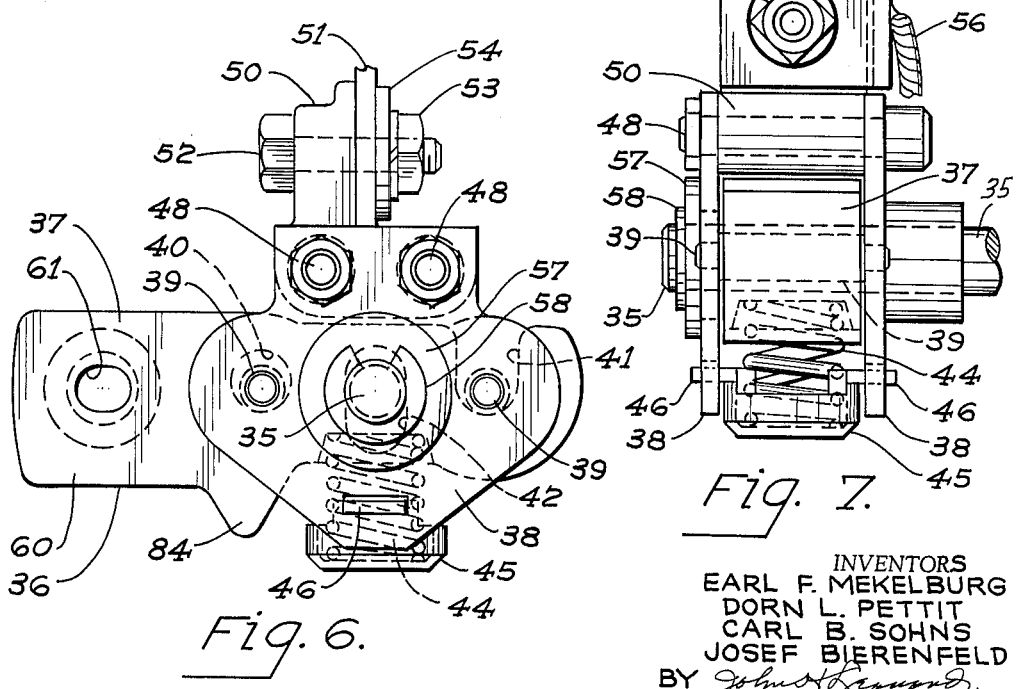
INVENTORS
EARL F. MEKELBURG
DORN L. PETTIT
CARL B. SOHNS
JOSEF BIERENFELD
BY John H. Leonard,
their ATTORNEY.

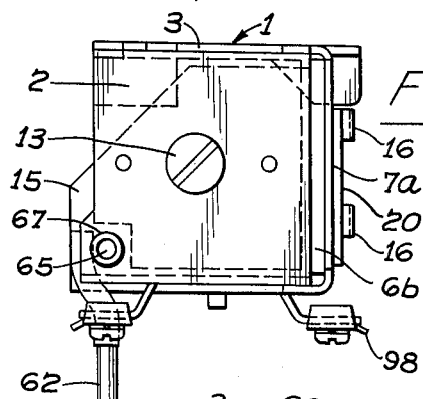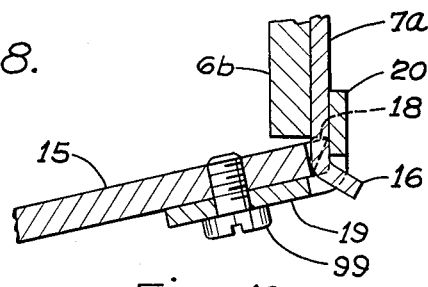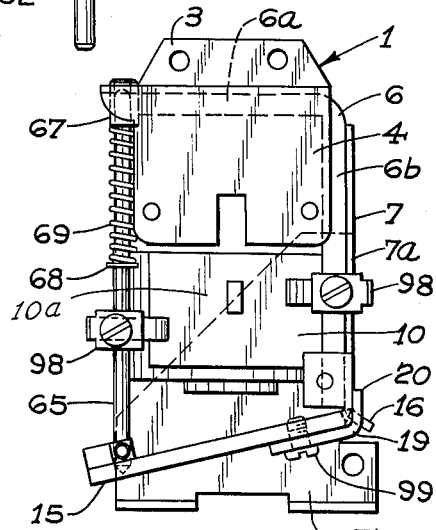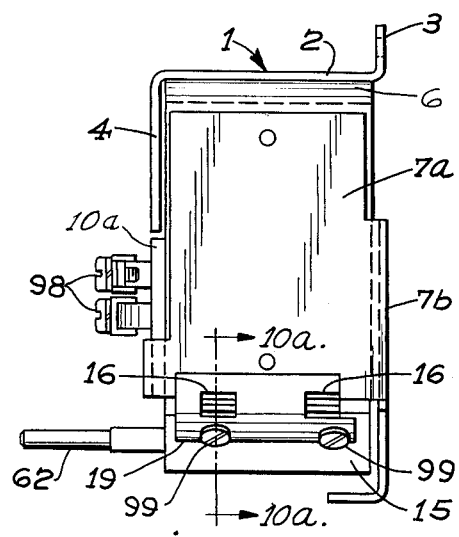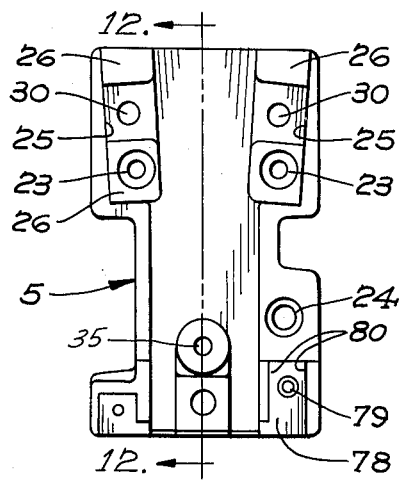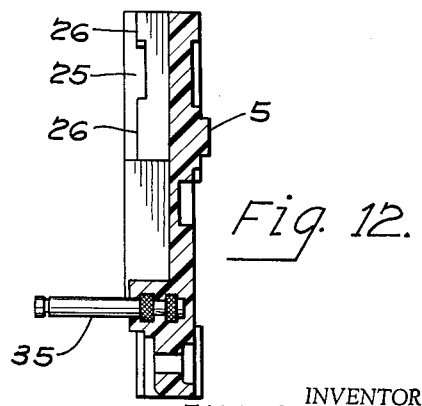

INVENTORS
EARL F. MEKELBURG
DORN L. PETTIT
CARL B. SOHNS
JOSEF BIERENFELD
BY
ATTORNEY.

INVENTORS
EARL F. MEKELBURG
DORN L. PETTIT
CARL B. SOHNS
JOSEF BIERENFELD
BY John H Leonard,
their ATTORNEY.

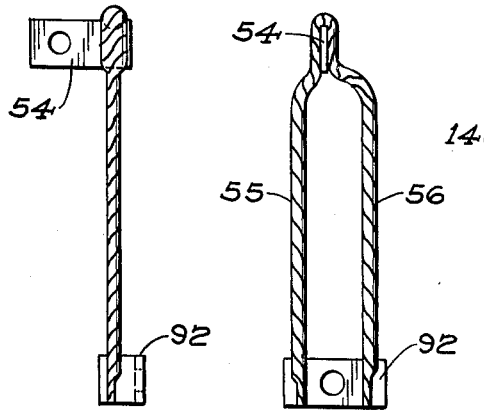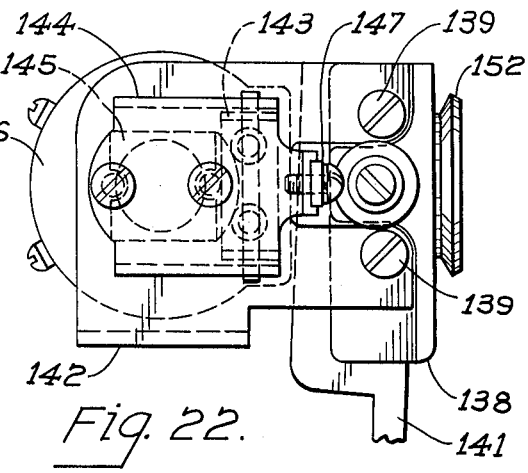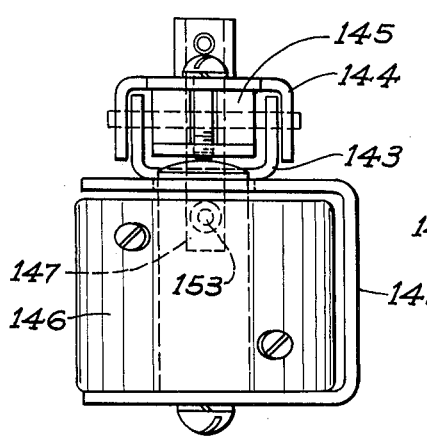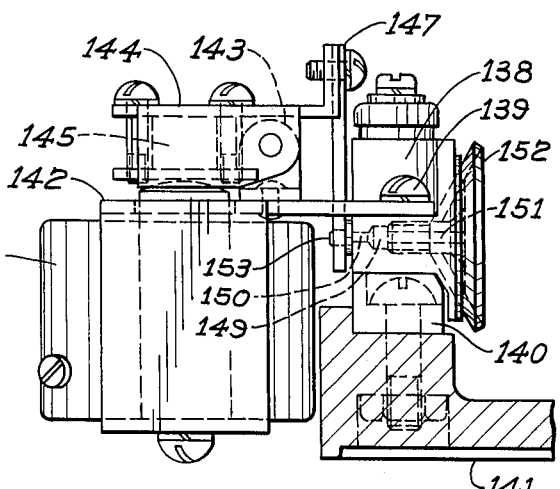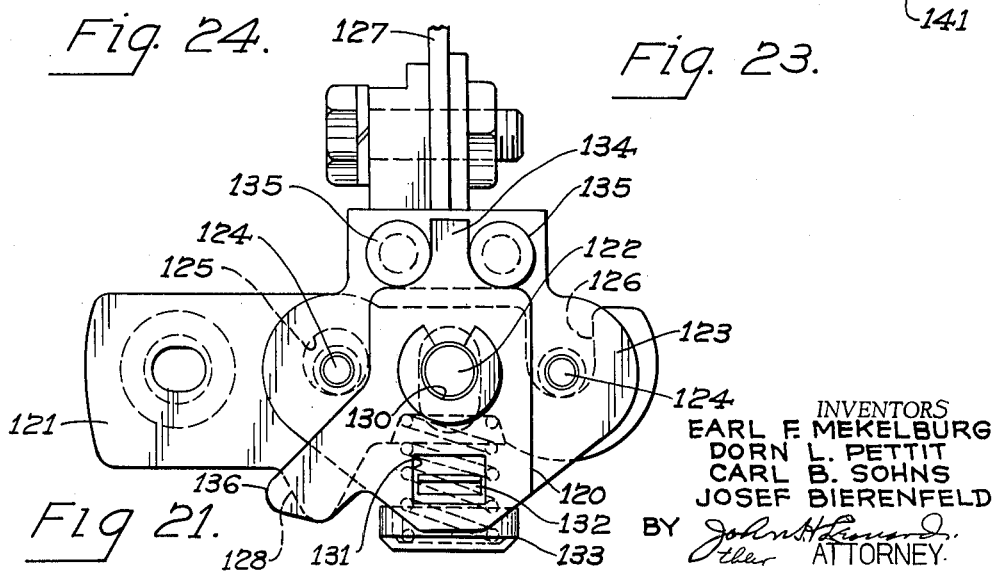

United States Patent Office 3,247,345
Patented Apr. 19, 1966

3,247,345
CONTACTOR AND CONTACTOR AND
ATTACHMENT COMBINATION
Earl F. Mekelburg and Dorn L. Pettit, Wauwatosa, and
Carl B. Sohns and Josef Bierenfeld, Milwaukee, Wis.,
assignors to Square D Company, Park Ridge, Ill., a
corporation of Michigan
Filed Mar. 8, 1963, Ser. No. 263,893
12 Claims. (Cl. 200—97)

This invention relates to electrical contactors.

For the purposes of illustration, the invention is disclosed as embodied in a contactor which is designed primarily for use in controlling the current flow in electrically driven lift trucks and the like, its uses for other purposes being readily apparent from the illustrative examples and objects.

An object of the invention is to provide a contactor of small physical size and high electrical capacity which can be mounted on a metal panel of such a truck and which has electric terminals which are readily accessible from the front of the panel, including the coil terminals, power terminals, control terminals, and terminals for interlocking switches for controlling related equipment.

The contactor has a molded base of electrical insulating material so arranged that various operating parts can be positioned and secured thereon readily due to the configuration of the base itself.

Another object is to provide a contactor which may be provided with mechanical as well as electrical interlocks; which can be connected to another like contactor and mechanically interlocked readily therewith; and which may be easily converted from instantaneous to delayed operation.

Another specific advantage is in the welding of leads to the flexible connectors so as to permit the leads to be precisely positioned on the device, rather than positioned in random fashion whereby cables of larger sizes may be used in contactors than have been practical heretofore in prior contactors of like capacity.

A specific advantage resides in the specific manner of mounting of the armature, and its connection with the movable contact by a rockable assembly so that the mass of the movable contact assembly as a whole is close to its rocking axis, whereby contact impacts and bounce are reduced to a minimum.

Other objects and advantages will become apparent from the following description, wherein reference is made to the drawings, in which:

FIG. 4 is a right end elevation of the contactor illustrated in FIGS. 1 through 3;

FIG. 5 is a bottom plan view of the contactor illustrated in FIGS. 1 through 4;

FIG. 6 is a fragmentary front elevation of a rocker arm and its guide with the contact positioned as illustrated in FIG. 1;

FIG. 7 is a right side elevation of the structure illustrated in FIG. 6;

FIG. 8 is a top plan view of a magnetic frame assembly of the present contactor;

FIG. 9 is a front elevation of the structure in FIG. 8 with the armature and push rod in place;

FIG. 10 is a right end elevation of the structure illustrated in FIG. 9;

FIG. 10A is an enlarged, fragmentary sectional view taken on the line 10A—10A in FIG. 10;

FIG. 11 is a front elevation of the molded contactor base of the present invention;

FIG. 12 is a section taken on the line 12—12 of FIG. 11;

FIG. 21 is a view similar to FIG. 6 but showing a timing interlock;

FIG. 22 is a top plan view of a plugging latch attachment used in connection with the present invention;

FIG. 23 is a front elevation of the structure illustrated in FIG. 22;

FIG. 24 is a left side elevation of the structure illustrated in FIG. 23;

FIG. 25 is a front elevation of the flexible connectors showing the nature of the terminals thereon; and FIG. 26 is a left side elevation of the structure illustrated in FIG. 25.

Figure 1:
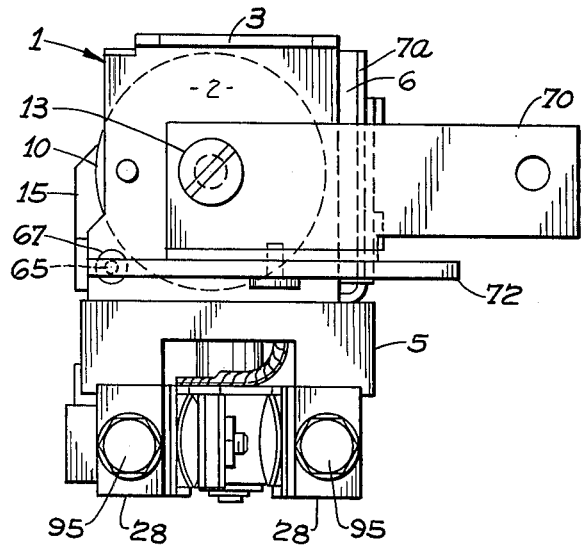
FIG. 1 is a top plan view of a contactor embodying the principles of the present invention.

Referring to the drawings, the contactor has a supporting frame indicated generally at 1, comprising a top plate 2 having an upturned rear flange 3 with apertures therein by which the member can be secured to a metal panel or base. The top plate 2 has a depending front flange 4 by which the molded insulating base 5, later to be described, is partially supported.

Connected to the underside of the top plate 2, is a metal magnet frame 6. As best illustrated in FIGS. 1 and 8 through 10, the frame 6 is in the form of an inverted L having an arm 6a juxtaposed against, and fitting, the underface of the plate 2 and a leg 6b depending at the front of the plate 2 and juxtaposed against the flange 4.

A supplemental frame portion or bracket 7 is provided, and has an upright leg 7a disposed at, and with its upper edge near to a lateral edge of the plate 2. It has a rear transverse portion 7b extending across the rear of the contactor with its rearward face coplanar with the rear face of the rear flange 3 of the plate 2. The rear portion 7b has an aperture for receiving a screw for securing it to the middle of the front panel. This structure comprises a basic supporting frame of the contactor.

For operating the contactor, an electromagnetic coil 10 is provided. The coil 10 is embedded in rigid molded insulating material and has a forward projection 10a which engages the rear face of the base 5 and prevents rotation of the coil about its axis. The coil is wound on a sleeve 11 which is received tightly on a core 12. A bolt 13 connects the core 12, top plate 2, and arm 6a of the magnetic assembly fixedly together. To operate the movable contact mechanism of the contactor, an armature 15 is provided. The armature is mounted adjacent the lower end of the coil for rocking about a horizontal axis extending in a direction forward, and rearwardly of the contactor. As illustrated in FIG. 10a, two out-turned ears 16, sloping downwardly and outwardly laterally of the contactor from the leg 7a, are provided. The armature 15 is provided with its upper face with a knife edge 18 which engages the ears 16 at their juncture with the lower edge of the leg 7a. A bracket 19 is secured by bolts to the underface of the armature 15 adjacent the knife edge and has an upturned flange portion 20 with cut-outs therein through which the ears 16 are received, respectively, so as to hold the knife edge permanently in position against the ears 16 at their juncture with the leg 7a for rocking about a fixed horizontal axis extending forwardly and rearwardly of the contactor.

As mentioned, the insulating base 5 is mounted on the forward face of the flange 4 of the plate 2. The insulating base 5, best illustrated in FIGS. 11 and 12, is free from installed parts. The base 5 is preferably Bakelite, or other stable electrical insulating material, molded accurately in one piece. The base 5 is connected at its upper end to the front flange 4 by suitable screws received through apertures 23 in the base 5. The base 5 is connected to the transverse portion 7b of the member 7, by a screw received through an aperture 24 in the base 5. By removing these three screws, the entire base 5, and the parts of the contactor carried thereon can be removed from the supporting frame.

The base 5 is provided at the upper portion of its forward face with spaced upwardly diverging lateral flanges 25 which lie along the raised bosses 26 on which stationary contacts 28 are mounted and properly aligned by engagement with flanges 25. The contacts 28 are secured in place by suitable bolts 29 which extend through bores in the contacts and through passages 30 in the base 5, and receive nuts disposed in suitable depressions in the back of the base 5. An insulating member 25a received between the bosses 26 insulates the screws 29 and the securing nuts from the flange 4.

A rocker arm assemblage, for supporting and moving a movable contact is mounted on the base. For this purpose, a pivot pin 35 has one end portion fixed in the base 5, as by bonding it therein during molding the base. The pin 35 extends horizontally forwardly from the base 5 and supports a rocker arm assembly 36 for rocking about the axis of the pin 35.

As best illustrated in FIG. 6, the rocker arm assembly 36 comprises a rocker arm 37 of electrical insulating material, such as Bakelite, having a bore which receives the pin 35 so that the arm 37 is rockably supported on the pin 35.

In snug sliding engagement with the forward and rearward faces of the rocker arm 37 are guide plates 38. The plates 38 are held in sliding juxtaposition to the opposite faces of the rocker arm 37 by means of rivets 39. For purposes later to be described, it is desirable that the plates be movable as a unit parallel to the front and rear faces of the rocker arm 37 by sliding along the front and rear faces of the rocker arm so as to permit proper cooperation of the movable contact and the stationary contacts under the influence of a biasing spring.

For this purpose, the rocker arm 37 has an enlarged aperture 40 through which one of the rivets 39 extends and another aperture 41 in the form of a slot through which the other one of the rivets 39 extends. The rivets 39 have substantial clearance with respect to the walls of their associated apertures 40 and 41. Also, the plates 38 have vertically elongated apertures 42 through which the pin 35 extends so as to permit movement of the plates relative to the pin endwise of the apertures 42. As a result of these connections the plates can shift to a limited extent transversely of the axis of the pin 35 relative to the arm 37 during rocking of the arm 37 about the pin axis. Thus, if the plates 38 are restrained from rocking about the axis of the pin with the rocker arm 37, as by closure of the contacts, the arm 37 can continue to rock. As the arm 37 does so, the plates are lifted upwardly by engagement of one of the rivets 39 with the lower periphery of the aperture 40. In the opposite direction of rocking of the arm 37 while the plates are restrained from rocking therewith, the other one of the rivets 39 is engaged by the wall of the aperture nad correspondingly lifts the plate 38.

In order to provide for holding the plate 38 centered in normal operating position yieldably while permitting their movement as thus described, a suitable biasing spring 44 is provided. The spring 44 presses upwardly at its upper end against the underside of the rocker arm 37, its line of force being directed generally through the axis of the pin 35. The lower end of the spring is seated in a suitable retainer 45 having ears 46 received through slots in the plates 38 for securing the retainer 45 in position on the plates 38.

Secured to the plates 38 by means of suitable rivets or bolts 48 is a movable contact holder 50 to which a movable contact 51 is securely fastened by means of a bolt 52 and cooperating nut 53. Interposed between one face of the movable contact 51 and the nut 53 is a terminal lug 54, to opposite faces of which are welded the flattened ends of the flexible cables 55 and 56, as best illustrated in FIGS. 25 and 26. For ease in connecting the rocker arm assembly in place on the pivot pin 35, the pin extends forwardly beyond the forward plate 38 and receives a washer 57 of insulating material. The pin has a circumferential notch forwardly of the washer which receives a snap washer 58.

In order to rock the rocker arm in response to energization of the coil, the rocker arm is provided at one end with an integral extension 60 having therein an elongated aperture 61. Mounted on the armature is a pin 62 which is received in the aperture 61, and thus rocks the arm 37 in response to the rocking of the armature.

It is noted that the axis of the pin 62, the axes of the rivets 39, the axis of the pin 35, and the rocking axis of the armature are preferably coplanar in the retracted position of the armature when the coil 10 is not energized, so that the most effective rocking moment without binding stresses is obtained during operation of the rocker arm 37 by the armature 15.

The armature is normally biased downwardly away from the pole piece 12 of the coil 10 when the coil is not energized. For this purpose, a suitable spring biased rod 65 is provided. The rod 65 has a reduced lower end portion 65a which is seated in an upwardly open aperture 66 in the armature adjacent the pin 62. The rod 65 extends upwardly through a suitable insulating sleeve 67 which is carried in the top plate 2. The pin is provided with a circumferential groove in which a lock ring 68 is seated. A biasing spring 69 is mounted on the rod and at its ends abuts the ring 68 and the lower end of the sleeve 67, and is stressed to urge the rod 65, and therefore the armature, downwardly and away from the coil.

The rod 65 extends through the sleeve 67 so as to protrude substantially above the level of the upper face of the top plate 2. A bracket 70 is secured by the bolt 13 on the top of the top plate 2 and has an upturned flange 71 which pivotally supports an interlocking rocker 72 with one end engaging the upper end of the rod 65 so that, upon movement of the armature upwardly upon energization of the coil, the rod 65 moves the engaged end of the rocker 72 upwardly and thereby rocks the opposite end of the rocker 72 downwardly. The other end of the rocker 72 is positioned so that it can engage a like rod 65 on a duplicate contactor when the two contactors are arranged side by side, and thereby provide a mechanical interlock between them, as will later be explained.

Figure 14:
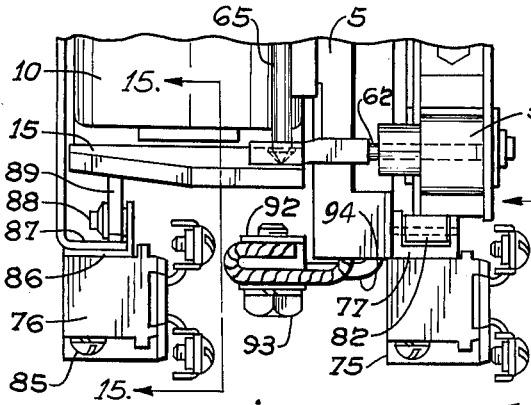
FIG. 14 is a left side elevation of the structure shown in FIG. 13 showing two interlocks in place.
Figure 13:
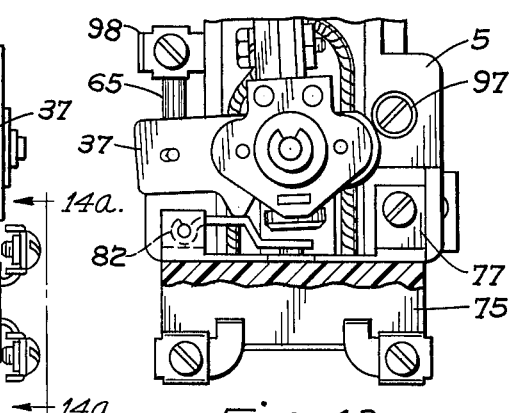
FIG. 13 is a fragmentary front elevation of a lower portion of the structure illustrated in FIG. 2, showing the front forward interlock switch and operating mechanism.
Figure 14A:
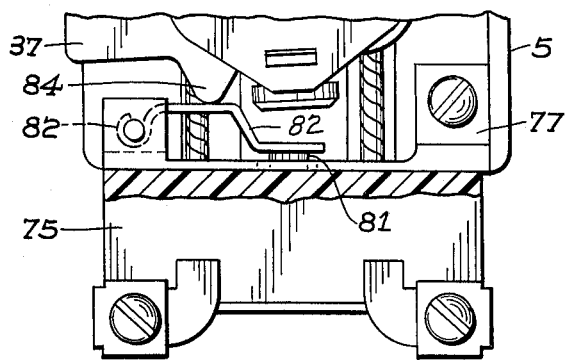
FIG. 14a is a fragmentary front elevation of part of the structure of FIG. 14, and is taken on line 14a—14a thereof.
Figure 15:
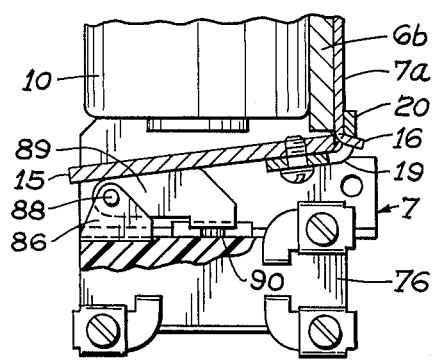
FIG. 15 is a sectional view taken on line 15—15 of FIG. 14 showing the rearward interlock.

As mentioned, it is desirable in many instances, to provide electrical interlocks between the contactor and other equipment. In the form illustrated, two such electrical interlocks are provided. These comprise a front interlock switch 75 and a rear interlock switch 76. These interlocks are shown as self restoring snap switches. As best illustrated in FIGS. 4 and 14, the snap switch 75 is secured to a suitable bracket 77 on the lower portion 78 of the base 5 by means of a suitable screw passing through the aperture 79 therein, as indicated in FIG. 11. The bracket is positioned accurately by and between suitable spaced shoulders 80 molded in the base 5, as best illustrated in FIG. 11. The switch 75 has the usual operating pin 81 which is engaged by the free end of a rock lever 82 pivotally mounted on the bracket 77 for swinging upwardly and downwardly.

Figures 2, 3:
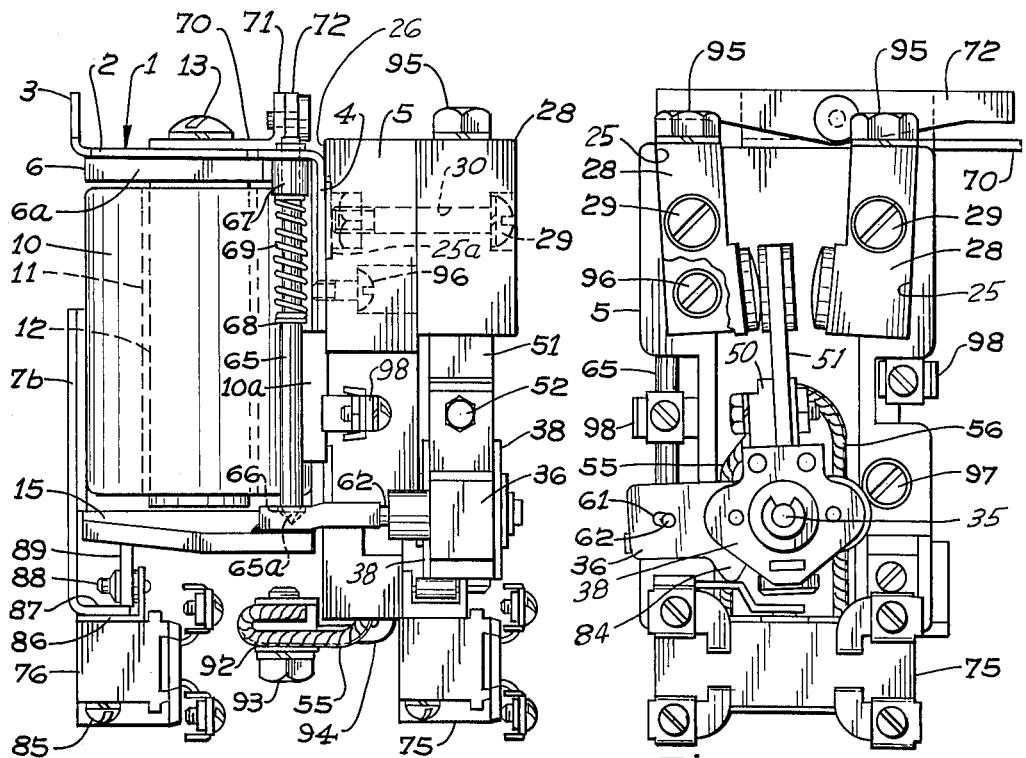
FIG. 2 is a front elevation of the contactor illustrated in FIG. 1.
FIG. 3 is a left end elevation of the contactor illustrated in FIGS. 1 and 2.

An operating finger 84 is provided on the rocker arm 37 for engaging the lever 82 between its pivotal axis and free end for depressing the lever 82 upon rocking of the rocking arm 37 in a counterclockwise direction, as viewed in FIG. 2, occasioned by the downward movement of the armature 15 by the spring 69 when the coil is deenergized.

If another additional electrical interlock is desired, the rearward interlock switch 76 is secured by bolts 85 to a suitable bracket 86 and to a flange 87 on the bottom of the rear portion 7b of member 7. Mounted by one end on the bracket 86 by means of a suitable horizontal forwardly extending pivot 88 is a rock lever 89. The other end of the lever 89 engages the operating pin or button 90 of the electrical interlock switch 76, which pin corresponds to pin 81 of the interlock switch 75. This arrangement is such that the armature, when retracted by means of the spring 69, depresses the pin 90 of the interlock 76.

The other ends of the flexible cables 55 and 56 are welded to the common U-shaped bracket 92 which is secured by a bolt 93 to an input power terminal 94. Connection of wires to the stationary contacts 28 are made by bolts 95, respectively. All of the bolts are readily accessible.

It is noted that the contacts 28 are secured to the base 5 by bolts 29 accessible from the front of the structure. For removing the base 5 from the supporting frame, bolts 96 which extend through the apertures 23 in the base 5 may readily be removed from the front of the device. Also, a bolt 97 which extends through the aperture 24 in the base 5 may be removed from the front.

By removing the snap ring 58, the rocker assembly comprising the rocker arm 37 and plates 38 can readily be removed as a unit, this ring being accessible from the front of the contactor. Furthermore, by removing the bolts 48, the movable contact holder 50 may be removed. By removing the bolt 52, the movable contact 51 and the terminal lug 54 of the flexible cables 55 and 56 may be disconnected.

The interlock switches 75 and 76 can be removed by bolts accessible from the front or from the bottom of the contactor and all of the terminals of the interlocks are accessible from the front. So also the bolts or screws that secure the entire base 5 and its supported mechanism to the frame are accessible from the front.

The terminals 98 of the coil 10 are exposed for access from the front at the edges of the back 5. The coil can readily be removed by removing the bolt 13, which is accessible from the top. The main terminal 94 may be removed by removing the bolt 93 at the bottom. The armature may readily be removed by removing the two screws 99 which secure the bracket 19 to the armature.

It is seen that the entire structure is well adapted for servicing and repair, for changing electrical connections, and for adding additional equipment, as desired.

Figure 16:
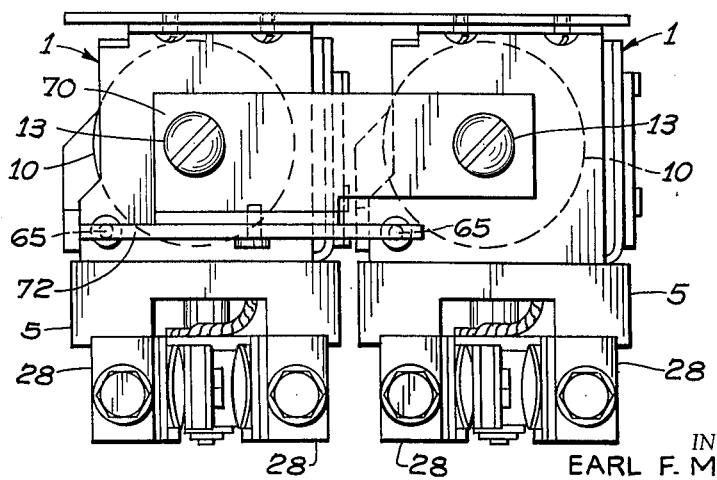
FIG. 16 is a top plan view showing two contactors such as illustrated in FIG. 1 arranged side by side and interlocked with each other mechanically.
Figure 17:
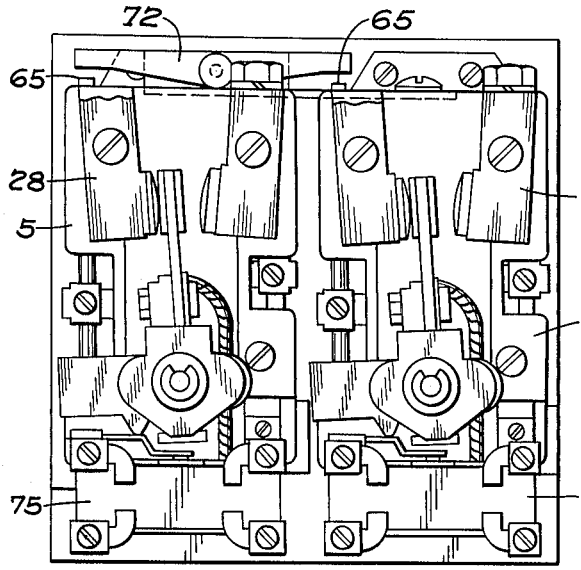
FIG. 17 is a front elevation of the structure illustrated in FIG. 16.

Referring next to FIGS. 16 and 17, duplicate contactors or switches, such as shown in FIGS. 1 through 4, are arranged side by side. In this relation, the lever 72 is positioned so that at one end it engages the upper end of the rod 65 of one switch and at the other end, engages the upper end of the rod 65 of a duplicate switch, or a time delay switch such as disclosed in FIGS. 18 through 20. The rock lever 72 is so related to the ends of the rods 65 that both switches cannot be closed at the same time, but one must be open before the other can be closed. Thus, the rods 65 for biasing the armatures away from the pole of the coil are combined with a single simple rocking lever 72 to provide a mechanical interlock between two switches.

Figure 20:
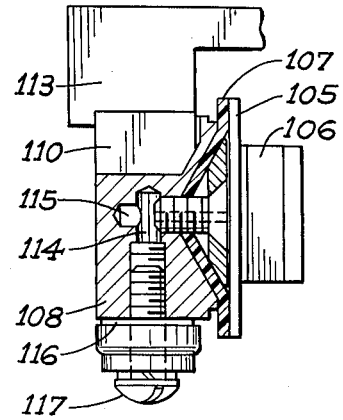
FIG. 20 is an enlarged fragmentary top plan view of the structure as viewed from line 20—20 in FIG. 18, part thereof being shown in section for clearness.
Figure 19:
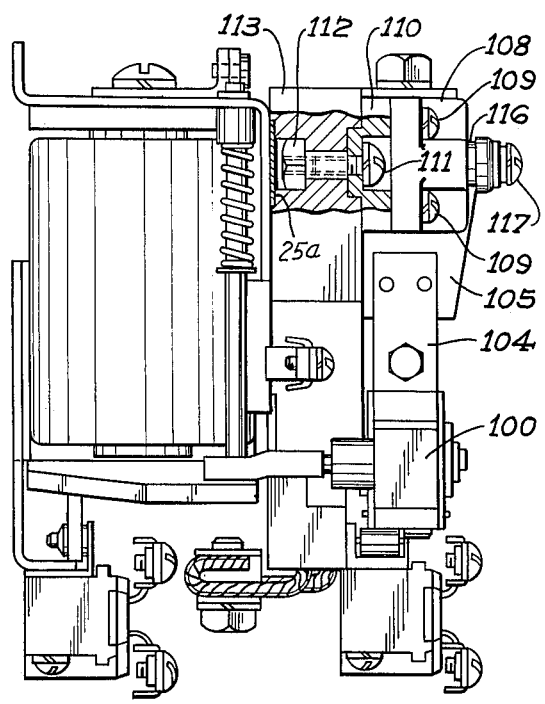
FIG. 19 is a left side elevation of the structure illustrated in FIG. 18.
Figure 18:
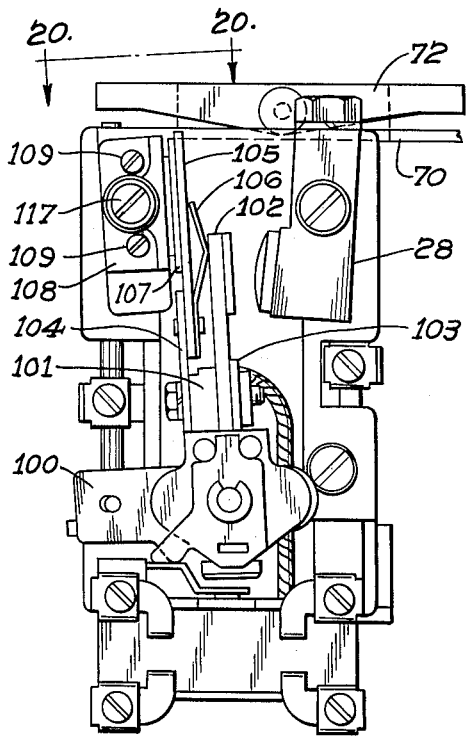
FIG. 18 is a front elevation similar to FIG. 2 of a modified contactor including a delayed action mechanism.

In some cases, a time delay action is desired. For this purpose, the arrangement shown in FIGS. 18 through 20 may be employed. The switch is shown in FIGS. 18 through 20, identical with that heretofore described, except that instead of the left hand stationary contact 28 of the switch illustrated in FIG. 2, a time delay device is provided, and the rocker assembly is previded with an interlock actuator. The rocker assembly is generally the same as the rocker assembly 36 heretofore described. It includes a rocker arm 100 which carries a contact holder 101, corresponding to the holder 50, which supports the movable contact 102. A cable terminal 103, corresponding to the cable terminal 54 heretofore described, is provided. Secured to the contact holder 101 is part of a time delay device comprising a timer plate and snubbing assembly. This device comprises a metal strip 104 bolted to the holder 101. The strip 104 carries an insulating member 105 and a snubbing spring 106 which is interposed between the outer face of the movable contact 102 and the inner face of the member 105. The member 105 has an outer smooth planar face, facing away from the contact 102, for engagement with a resilient suction cup 107.

The cup 107 is carried by a body 108 in position for face to face juxtaposition with the outer face of the member 105 when the switch is open. The body 108 is secured by screws 109 to an adaptor bracket 110. The bracket 110 is secured by a bolt 111 and a bolt 112 to the Bakelite base 113, corresponding to the base 5 heretofore described. The body 108 is provided with an inlet duct 114 and a transverse duct 115 communicating therewith and with the interior of the cup 107. The admission of air into the duct 114 is controlled by a resilient sealing disc 116 which is adjustably seated by a screw 117 to control the rate of admission of air. By adjusting the admission of air through the duct 114, by the valve 116 and screw 117, the duration of the time delay can be controlled.

Thus upon opening of the contact 102, the member 105 engages and flattens the suction cup appreciably so as to expel air therefrom whereupon the suction is effective for preventing rapid return of the contact 102 in the opposite direction, thus providing the time delay.

As heretofore described in connection with the interlock switch 75 in FIGS. 1 through 4, and 14, the rocker arm 37 rocks under the influence of the coil in a direction to move the movable contact 51 to closed position against the right-hand contact 28 (FIG. 2). The finger 84 thereon thereby is lifted clear of the lever 82, thereby releasing of the pin 81 of the interlock switch 75. However, if the time delay mechanism described above is provided, energization of the coil could not thereafter cause the rocker arm 37 to move the movable contact to the closed position immediately. Instead, due to the lost motion between the arm 37 and plates 38, the lifting of the end of the arm 37 by the pin 62 would cause the arm 37 to lift the plates 38 and continue its rocking movement and, thereby moving the movable contact 51 upwardly while it remains open. This movement of the rocker arm 37 would disengage the finger 84 from the lever 82 and would thereby release the pin 81 for operation of the switch 75 while the movable contact 51 is open.

It sometimes happens in such cases that a timed interlock is desired. In such a case, as illustrated in FIGS. 6, 18, 19 and 21, the washer, such as 58, on the switch illustrated in FIG. 2, is removed and replaced by a timing interlock actuator 120.

In FIG. 21, the rocker arm 121, as in the case of the arm 37, is rockably mounted on a pivot 122 and is connected to plates 123 by rivets 124. The rivets 124 operate in apertures 125 and 126 in the arm 121 so as to provide the lost motion between the arm 121 and plates. Thereby, upon rocking the arm 121 clockwise in FIG. 21 by energization of the coil, the movable contact 127 is moved to closed position. Upon the contact 127 being stopped by engagement with the stationary contact, the rocker arm 121 continues to rock, thus moving the plates 123 and movable contact 127 upwardly so that it wipes the face of the stationary contact, as in the case of the arm 37.

However, while the cup 107 is preventing movement of the movable contact 127 toward closed position during rocking of the arm 121 by the coil, the arm 121 nevertheless rotates clockwise. An interlock finger 128 thereon, corresponding to finger 84 in FIG. 2, then lifts clear of the operating lever 82 so that the pin 81 of the interlock switch 75 is released while the contact 101 is still in open position.

To prevent this release before closure of the movable contact, the actuator 120 is provided. It comprises a sheet of phenolic resin having an aperture 130 which receives the pivot 122 and constrains the actuator to rock about the fixed axis of the pivot regardless of the rise or fall of the plates 123. The actuator has an aperture 131 which fits one of the ears 132 of a spring retainer 133 with sufficient clearance to permit the plates 123 to rise and fall relative to the actuator 120.

The actuator 120 has a finger 134 which extends between the rivets 135 so that they constrain it to turn with the plates 123. Thus the actuator does not rock unless the plates 123 rock. The actuator has a finger 136 which is arranged so that, although the rocker arm 121 moves its finger 128 to an out-of-the-way position with respect to the lever 82, the finger 136 remains in position to hold the lever 82, and thereby the pin of the switch 75 depressed. This is because the plates 123 and actuator 120 are prevented by the suction cup 107 from rocking. This condition remains unchanged until the cup 107 releases the movable contact so that the rocker arm, the plates 123, and actuator 120 can rock together thereby moving the finger 136 clear of the lever 82 and thereby releasing the pin of the switch 75.

Referring now to FIGS. 22 through 24, in some cases a plugging unit is desirable for controlling the time delay. In such case, a body 138, corresponding to the body 108 heretofore described, is connected by screws 139 to a bracket 140 on the insulating base 141 corresponding to the base 5. A suitable bracket 142 is secured between the heads of the bolts 139 and the time delay body 138. The bracket 142 carries a yoke 143 on which is mounted a rocker 144 which supports a permanent magnet 145. In coaxial relation with the magnet 145 is an electromagnetic coil 146 which may be supported on the bracket 142. The permanent magnet and coil are so related that when the current flows in one direction in the coil 146 they attract each other, and when in the opposite direction, they repel each other.

Mounted on the rocker 144 is a valve lever 147 which, when the permanent magnet and electromagnet are mutually attracted, is swung by the rocker 144 against the rear face of the body 138. The body 138 is provided with transverse duct 149 which has an inlet port 150 at the rear face of the body 138 and an outlet port 151 opening into the time delay suction cup 152. The lever 147 carries at its lower end a port seal 153 which, when the lever is pressed toward the body 138, seals the inlet port 150, thus assuring a full time delay. On the other hand, if due to reverse energization of the electromagnetic coil 146, the coil repels the permanent magnet 145, the lever 147 is operated to remove the seal 153 from the port 150 and thereby eliminate further time delay.

The electromagnetic coil 146 is preferably connected in a circuit with the armature of the motor of the truck so as to be responsive to the current flow in the armature. Changes in the electrical condition of the armature circuit which occur during plugging thus control the time delay period.

It is apparent from the foregoing that the contactor and its attachments permits ready adaptation to a large number of control operations, including time delays, interlocks, and timed interlocking. All connections of terminals, operating parts and attachments can be made readily while the contactor is mounted on a metal panel of a truck or the like.

Having thus described our invention, we claim:

1. A magnetic contactor comprising a support having a rear portion adapted for connection to a forward face of a panel and having a front portion spaced forwardly from the rear portion, an electromagnetic coil and armature assembly mounted on the support between said portions, a molded one piece base of electrical insulating material mounted on said front portion in forward overlying relation to said assembly, a stationary contact on the base, a forwardly extending pivot pin mounted on the base, a rocker assembly rockably mounted on said pin, a movable contact supported by said rocker assembly and movable thereby into and out of contact with the stationary contact, and means connecting the armature and rocker assembly and including a second pin mounted on the armature and extending forwardly therefrom parallel to said pivot pin, and pin receiving means on the rocker assembly for receiving said pins endwise, respectively, by movement of the rocker assembly rearwardly to operating position on the base from a position in front of the base while the pin receiving means are aligned with the pins, respectively.

2. A magnetic contactor comprising a support, an electromagnetic coil mounted thereon, an armature, pivot means connecting the armature to the support for rocking about a fixed axis in one direction upon energization of the coil, a rocker, additional pivot means mounting the rocker on the support for rocking about a rocking axis parallel to and spaced from the fixed axis, a pin on the armature having a pin axis parallel to the fixed axis and spaced from said fixed axis and on the opposite side of the rocking axis from the fixed axis, said axes being approximately coplanar when the armature is in retracted position relative to the coil, means interconnecting the pin on the armature with the rocker, means biasing the armature opposite to said one direction, a stationary contact carried by the support, and a movable contact carried by the rocker and moved thereby into and out of engagement with the stationary contact.

3. A contactor according to claim 2 wherein the stationary contact is normally spaced above the level of the rocking axis of the rocker and at one side of a vertical plane through the rocking axis, and the stationary contact has a mass substantially greater than the mass required for conveying the current to be carried by the contacts so as to provide a heat sink for heat produced by arc interruption.

4. A magnetic contactor comprising a stationary contact, a movable contact, a rocker rockable about a fixed axis for moving the movable contact to and from closed position, a support supporting the contacts and rocker, electromagnetic means including an armature mounted on the support for rocking in opposite directions and rockable in one direction by the electromagnetic means connected to the rocker for rocking the rocker by the armature in opposite directions, a spring biasing the armature to rock in an opposite direction to said one direction, a rocking interlock lever pivotally mounted on the support, connecting means driven by the armature and connected operatively to one end of the lever to rock the lever in one direction when the armature is rocked in its said one direction by the electromagnetic means, the other end of the lever extending beyond one side of the support and being adapted to be connected operatively to a duplicate connecting means of another contact having its support disposed alongside to said first mentioned support in alignment therewith, to interlock the armatures so that when one is rocked by the electromagnetic means in said one direction to contact making position the other one is held out of contact making position.

5. A magnetic contactor comprising a stationary contact, a movable contact, a rocker rockable about a fixed axis for moving the movable contact to and from contact positions, a support supporting the contacts and rocker, an electromagnetic coil, an armature driven thereby and connected to the rocker for rocking the rocker, an interlock rock lever mounted on the support and engageable and rockable by the armature as the armature is driven by the coil, a self-restoring interlock switch supported by the support, operating means on the switch and engaged by the rock lever and movable thereby to move the switch out of self-restored condition when the armature is driven by the coil, a finger on the rocker, an additional self-restoring interlock switch mounted on the support, second operating means for the switch and operatively interconnected with the finger for movement of the second operating means to move the switch out of additional self-restored position when the rocker is rocked in one direction, and means connecting the rocker to the armature for rocking of the rocker thereby, whereby the two interlock switches are operable in predetermined relation to the operation of the contactor.

6. A structure according to claim 5 wherein means are provided for returning the armature in the opposite direction from that in which driven by the coil, the armature is drivingly connected to one end of the rocking interlock lever to rock the rocking interlock lever in one direction, the other end of the interlock lever is disposed outwardly beyond the support and adapted to be connnected operatively to a duplicate connecting means of another contactor to interlock the armatures.

7. In a contactor including a support, a stationary contact thereon, a movable contact, means for moving the movable contact into engagement with the stationary contact, complementary time delay means carried by the support and connected for movement with the movable contact for delaying movement of the movable contact to contact making position, said means for moving the movable contact comprising a rocker arm carried by the support, lost motion means connecting the rocker arm to the movable contact so that the arm can rock in contact making direction while the movable contact is being delayed by the time delay means and while the lost motion means remains stationary, a self-restoring interlock switch carried by the support, an operating finger on the arm and connected to the switch and operable to move the switch out of self-restored condition when the arm moves away from contact making position, and to release the switch for self-restoration when the arm rocks partway toward contact making position, an actuator connected to the lost motion means and connected to the switch to hold the switch out of self-restored condition, after its release by the finger, until the lost motion means has closed the contacts, and resilient means interconnecting the arm and lost motion means and yieldably urging the lost motion means in the contact making direction against the resistance of the time delay means when the rocker arm has rocked a predetermined distance in the contact making direction.

8. A contactor comprising a support, a stationary contact thereon, an electromagnetic coil, an armature responsive to the coil and moved in one direction thereby when the coil is energized, a movable contact driven by the armature, a biasing member movably mounted on the support and connected at one end to the armature for movement thereby in a predetermined direction when the armature is moved in its said one direction, and operative to return the armature to starting position when the coil is deenergized and the member is moved opposite to its said predetermined direction, a spring operatively interposed between the support and member biasing the member opposite to its said predetermined direction, a movable interlock member carried by the support and connected at one of its ends to the other end of the biasing member for operation thereby, said interlock member having its other end accessible for connection to a like biasing member of a duplicate contactor with its support arranged alongside said support and aligned laterally therewith for operating the said like biasing member.

9. A contactor according to claim 8 wherein the biasing member is a rod mounted in the support for axial movement in a fixed path and having one end engaging the armature for movement therewith and the other end extending beyond the exterior of the support, and the interlock member is a rock lever pivotally mounted on the support for rocking in a plane parallel to the said fixed path, and extending laterally of the support, said lever having one end engaged by said other end of the rod and the other of its ends spaced outwardly beyond the side of the support.

10. A contactor comprising a support, a stationary contact thereon, a rocker arm pivotally mounted on the support, means for rocking the arm in opposite directions, selectively, a pair of guide plates spaced apart endwise of the rocking axis and accommodating the arm therebetween, lost motion connecting means yieldably connecting the plates to the arm for rocking movement therewith about said axis and for yieldably resisted movement relative thereto, parallel to a plane normal to said axis, generally radially of the rocking axis, a movable contact connected to the plates for movement therewith for engaging and disengaging the stationary contact, and said movable contact being movable when in contact with the stationary contact in wiping relation to the contact face of the stationary contact by said yieldably resisted movement of the guide plates.

11. The contactor of claim 7 characterized in that said time delay means comprises a resilient suction cup member and a cooperating member movable toward and away from each other, said cooperating member having a surface engageable with the suction cup to expel air therefrom when the cup and surface are moved into contact, and said cooperating member being held by suction of the cup member against the cup member after expulsion of said air, and one of said members being supported by the support, and the other of said members being movable in predetermined relation to the movement of the movable contact.

12. A magnetic contactor in accordance with claim 2 characterized in that a pair of flexible cables are provided for conducting current from a terminal to the movable contact, said conductors each being flattened at one end, said flattened ends being welded to opposite sides, respectively, of a metal common connecting lug, said lug being in juxtaposition to a face of the movable contact, the other ends of said cables being flattened, a terminal lug having a central portion detachably connected to the terminal, said other flattened ends being welded to opposite margins, respectively, of the terminal lug.

(References on following page)

References Cited by the Examiner
UNITED STATES PATENTS

| | | | |
|---|---|---|---|
| 2,253,142 | 8/1941 | Seeley | 200—104 X |
| 2,336,871 | 12/1943 | Lake | 200—104 X |
| 2,347,528 | 4/1944 | Weiser. | |
| 2,446,299 | 8/1944 | Nelson | 200—104 X |
| 2,774,841 | 12/1956 | Weinfurt | 200—97 |
| 2,866,047 | 12/1958 | Stuellein et al. | 200—166 |
| 2,902,559 | 9/1959 | Morris | 200—87 |
| 2,908,781 | 10/1959 | Brunicardi | 200—87 |
| 2,908,784 | 10/1959 | Kuhn et al. | 200—104 |
| 2,916,582 | 12/1959 | Hufnagel | 200—97 |
| 2,960,583 | 11/1960 | Fisher et al. | 200—87 |
| 3,002,074 | 9/1961 | Eadie | 200—166 |
| 3,032,627 | 5/1962 | Ronk | 200—87 |

BERNARD A. GILHEANY, *Primary Examiner.*

ROBERT K. SCHAEFER, *Examiner.*